(12) United States Patent
Karam (10) Patent No.: US 7,940,787 B2
(45) Date of Patent: May 10, 2011

(54) LOW-POWER ETHERNET DEVICE

(75) Inventor: Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1166 days.

(21) Appl. No.: 11/216,642

(22) Filed: Aug. 30, 2005

(65) Prior Publication Data

US 2009/0088908 A1    Apr. 2, 2009

(51) Int. Cl.
*H04L 12/10* (2006.01)

(52) U.S. Cl. .................................. 370/419; 370/463

(58) Field of Classification Search ................ None
See application file for complete search history.

(56) References Cited

U.S. PATENT DOCUMENTS

| | | | |
|---|---|---|---|
| 5,539,602 A * | 7/1996 | Schmitz et al. | 361/42 |
| 6,640,308 B1 | 10/2003 | Keyghobad et al. | |
| 6,986,071 B2 * | 1/2006 | Darshan et al. | 713/330 |
| 7,154,381 B2 * | 12/2006 | Lang et al. | 340/310.11 |
| 2005/0086546 A1 | 4/2005 | Darshan et al. | |

FOREIGN PATENT DOCUMENTS

| WO | 2004/073254 A1 | 8/2004 |
|---|---|---|
| WO | 2004073254 A1 | 8/2004 |

OTHER PUBLICATIONS

PCT/US06/33665 IPER dated Mar. 13, 2008 of corresponding patent application U.S. Appl. No. 11/216,642; pp. 1-6.
IEEE Std 802.3, Part 3: Carrier Sense Multiple Access with Collision Detection (CSMA/CD) Access Method and Physical Layer Specifications, sections 1-5, 2005.
IEEE Std 1802.3-2001, Part 3: Carrier Sense Multiple Access with Collision Detection (CSMA/CD) Access Method and Physical Layer Specification, Oct. 19, 2001.
PCT/US06/33665 International Patent Application International Search Report and Written Opinion dated May 1, 2007 of corresponding patent application U.S. Appl. No. 11/216,642, 2 pages.

* cited by examiner

*Primary Examiner* — Kwang B Yao
*Assistant Examiner* — Alex Skripnikov
(74) *Attorney, Agent, or Firm* — Patterson & Sheridan, LLP (57) ABSTRACT

In accordance with the teachings of this disclosure, an Ethernet device is provided that draws current below a predetermined voltage, and as the voltage across the device exceeds the threshold, the device transforms into a high-impedance state, appearing as a high impedance device. Once in the high-impedance state, the discovery process proceeds normally as the current drawn through the high-impedance device is no more than normally occurs due to leakage or other typical conditions. Thus, the IEEE discovery now proceeds normally in the higher voltage ranges (6V to 9V) where the device of this disclosure is effectively out of the circuit, causing no interference.

8 Claims, 13 Drawing Sheets

PRIOR ART

FIG. 1A

PRIOR ART

FIG. 1B

PRIOR ART

PRIOR ART

LOW-POWER ETHERNET DEVICE

FIELD OF THE INVENTION

The present invention relates generally to networking equipment, which is powered by, and/or powers other networking equipment over wired data telecommunications network connections.

BACKGROUND OF THE INVENTION

Inline Power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission of Ethernet packets with the transmission of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RJ-45 connectors (male or female, as appropriate) are typically used on both ends of all Ethernet connections. They are wired as defined in the IEEE 802.3af standard.

Figure 1A:
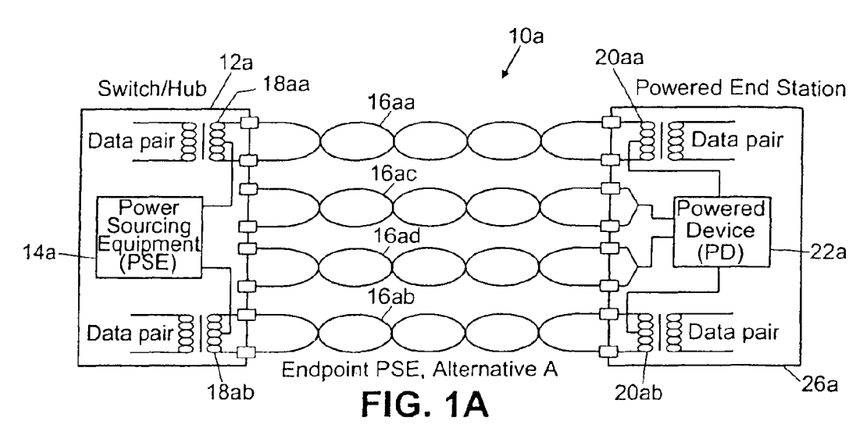
FIGS. 1A, 1B, 1C, 1D and 1E are electrical schematic diagrams of portions of data telecommunications networks in accordance with the prior art.
Figure 1B:
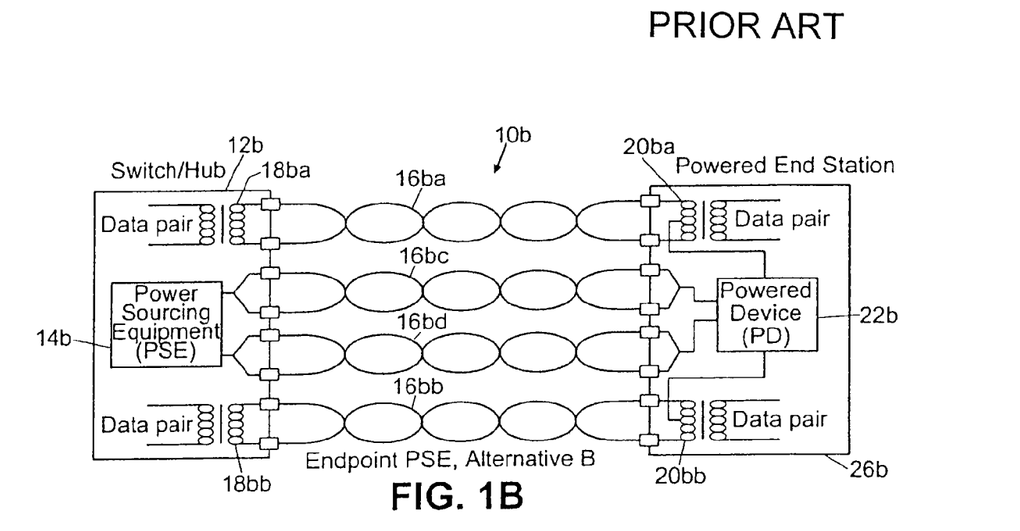
Figure 1C:
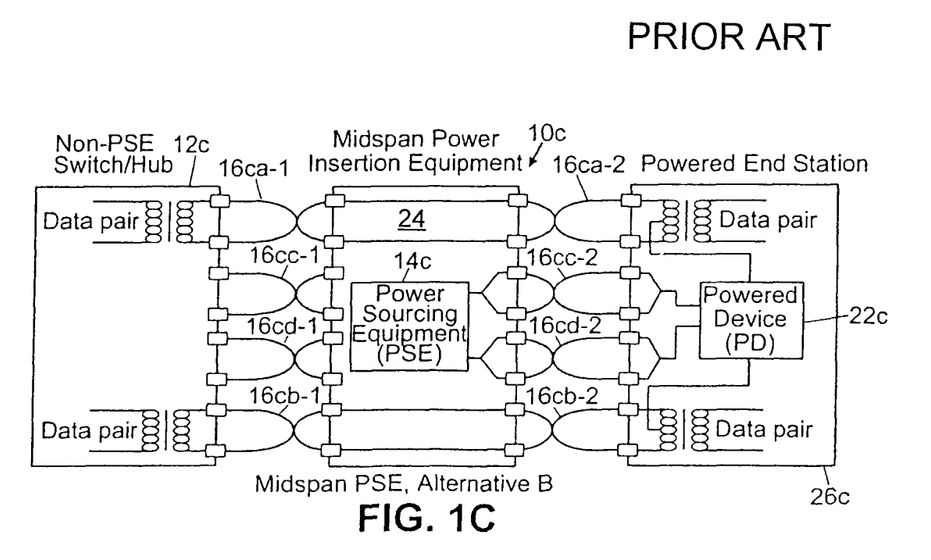

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the variants described above.

Figure 1D:
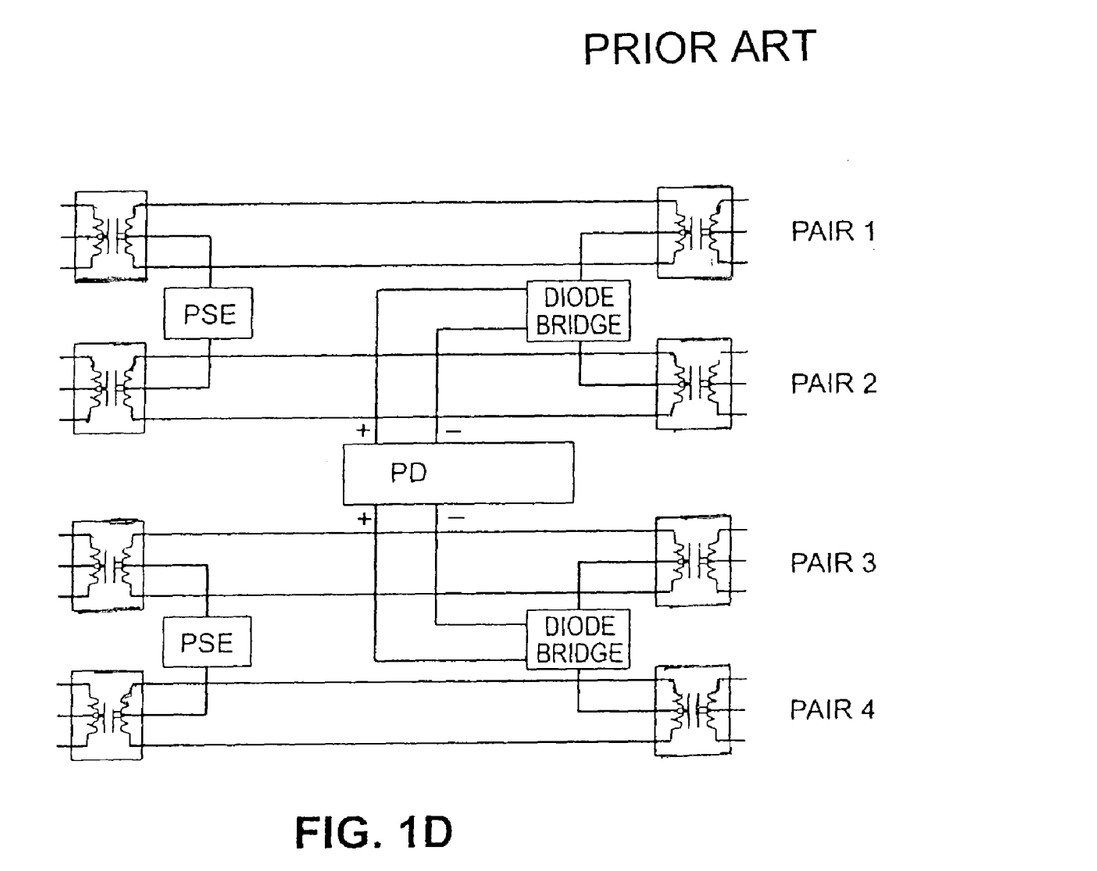
Figure 1E:
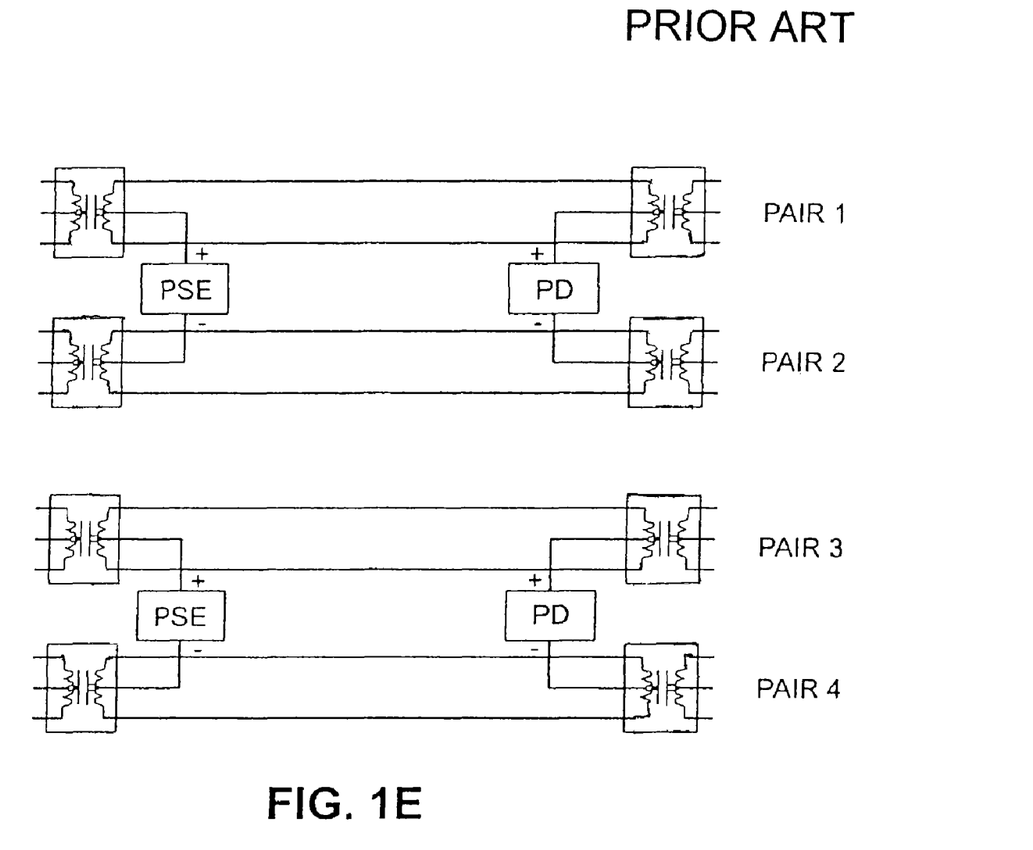

Turning now to FIGS. 1D and 1E, electrical schematic diagrams illustrate variants of the IEEE 802.3af standard in which 1000 BaseT communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1,2, Pair 3,4 or Pair 4,5, Pair 7,8. In the circuit shown in FIG. 1E a PD associated with Pair 1-2 is powered by Inline Power over Pair 1-2 and a PD associated with Pair 3-4 is similarly powered. The approach used will depend upon the PD to be powered. Inline Power is also available through techniques that are non-IEEE 802.3 standard compliant as is well known to those of ordinary skill in the art.

In order to provide regular Inline Power to a PD from a PSE it is a general requirement that two processes first be accomplished. First, a "discovery" process must be accomplished to verify that the candidate PD is, in fact, adapted to receive Inline Power. Second, a "classification" process must be accomplished to determine an amount of Inline Power to allocate to the PD, the PSE having a finite amount of Inline Power resources available for allocation to coupled PDs.

The discovery process looks for an "identity network" at the PD. The identity network is one or more electrical components that respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some Inline Power (not "regular" Inline Power, i.e., reduced voltage and limited current) as the discovery signal to measure resistance across the two pairs of conductors to determine if the 25,000 ohm resistance is present. This is typically implemented as a first voltage for a first period of time and a second voltage for a second period of time, both voltages may exceed a maximum idle voltage (0-30 VDC in accordance with the IEEE 802.3af standard and can reach a maximum of 30v) which may be present on the pair of conductors during an "idle" time while regular Inline Power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
|---|---|---|
| 0 | 0-5 | 15.4 |
| 1 | 8-13 | 4.0 |
| 2 | 16-21 | 7.0 |
| 3 | 25-31 | 15.4 |
| 4 | 35-45 | Reserved |

The discovery process is therefore used in order to avoid providing Inline Power (at full voltage of −48 VDC) to so-called "legacy" devices, which are not particularly adapted to receive or utilize Inline Power.

The classification process is therefore used in order to manage Inline Power resources so that available power resources can be efficiently allocated and utilized.

The IEEE 802.3af standard, however, does not provide for a device to be powered at low levels, i.e., below about 5V prior to the discovery process being completed, 802.3af allows a PSE to deliver no more than 5 mA while detection is active, this assumes a single PD attached to a single PSE. If more than one PD needs to connect to a single PSE (in a serial fashion), the order of such connectivity to the PSE affects the complexity and the ability of the PSE to discover the presence or 'introduction' of the 25 kΩ resistor that is now present while an additional PD is drawing low-level currents.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Embodiments of the present invention described in the following detailed description are directed at a low-power Ethernet powered device. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2:
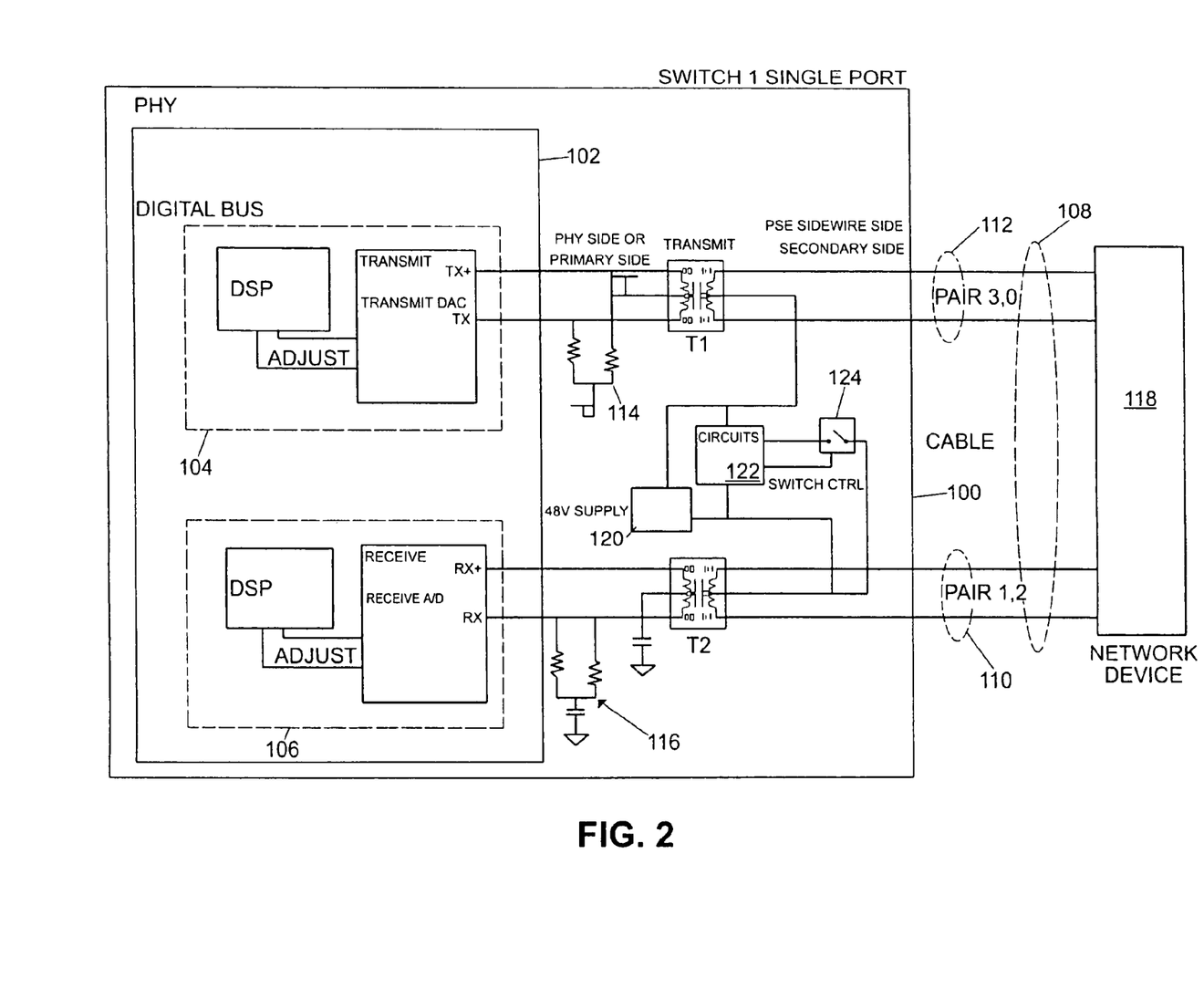
FIG. 2 is an electrical schematic diagram of a typical Ethernet 10/100 Base T connection in accordance with the prior art.

Turning now to FIG. 2 a typical 2-pair Ethernet (10 Base T, 100 Base T and 1000 BT if 4-pairs were used) connection is illustrated. Box 100 encompasses the Ethernet port as it might exist in a network device such as a switch, hub, router or like device. Within port 100 is a PHY or physical layer device 102, which includes transmit circuitry 104 and receive circuitry 106. The transmit circuitry 104 interfaces to a connector such as an RJ-45 connector (not shown here) and through the connector to a cable 108 which includes at least two pairs of conductors, the Pair 1-2 (110) and the Pair 3-6 (112). The interface between the transmit circuitry 104 and the cable 108 includes a center-tapped magnetic device such as transformer T1. T1 has a PHY-side including pins 1 and 2 and center tap 6, and a wire side including pins 3 and 5 and center tap 4. The PHY side is also referred to as the primary side; the wire side is also referred to as the secondary side of the magnetic device T1. Termination circuitry 114 provides a Vdd bias (here illustrated as +3.3 VDC) to the primary of T1. The secondary of T1 is coupled to cable pair 112 which is, in turn, coupled in operation to a network device 118 which may be another hub, switch or router or a PD such as a Voice Over Internet Protocol (VOIP) telephone or other network device.

The interface between the receive circuitry 106 and the cable 108 includes a center-tapped magnetic device such as transformer T2. T2 has a PHY-side including pins 1 and 2 and center tap 6, and a wire side including pins 3 and 5 and center tap 4. The PHY side is also referred to as the primary side; the wire side is also referred to as the secondary side of the magnetic device T2. Termination circuitry 116 provides a ground bias to the primary of T2. The secondary of T2 is coupled to cable pair 110 which is, in turn, coupled in operation to a network device 118. If the pairs of conductors shown belonged to a 1000 Base T wired data telecommunications network segment then each pair would transmit and receive at the same time and all four pairs in the cable would be used.

Center tap pins 4 of T1 and T2 are coupled to inline power circuitry including a 48 VDC power supply 120 for providing Inline Power over cable 108, control circuitry 122 and switch circuitry 124.

As mentioned above, the Ethernet specification does not provide for powering a load, such as an LED, sensor, or other load, that requires sourcing power from the switch below 5V (other than powering a phone). It is contemplated that a device may be desirable that must source power in the range of a few to tens of milliamps of current in the range of approximately 3.3V-5V. It is further contemplated that such a device may be active prior to 48V being applied, and becomes inactive when the 48V is applied and no longer requires current.

The present disclosure provides for a special device that may receive current from an Ethernet switch at lower voltage levels, i.e., between approximately 3.3V to 5V, but at the same time allowing proper Ethernet discovery of a normal powered device (such as a phone) including a 25 kΩ discovery resistance.

To illustrate the problem presented, we may assume that an LED is desired to be illuminated. In this case, the system must bias series diodes while the switch searches for a 25 kΩ resistance to be plugged in. The switch faces the challenge of resolving the slope (i.e., calculating the slope=dV/di as described earlier) since approximately 170 µA and 300 µA, (if a force-current based discovery is used) must be detected and resolved out of the approximately 3 mA or possibly higher current levels This is a difficult task for a circuit designed to resolve 300 µA while discovery is active in order to find the 25 kΩ signature resistance while in parallel. The present disclosure provides a lower impedance path on that same circuit in order to deliver the 3 mA current of higher current required for the device of this disclosure.

The present disclosure provides for a powered device that can coexist with present 802.3af PD based Ethernet systems such that the 25 kΩ discovery process properly take place without the need to resolve current levels having ratios of approximately 10:1. The present disclosure thus provides the benefits of a lower-power device without the requirement for higher resolution (and higher cost) circuitry, while enabling an extra load to draw power at the same time in the absence of a conventional PD.

In accordance with the teachings of this disclosure, a device is provided that draws current below a predetermined voltage, and as the voltage across the device exceeds the threshold, the device transforms into a high-impedance state, appearing as a high impedance device. Once in the high-impedance state, the discovery process proceeds normally as the current drawn through the high-impedance device is no more than normally occurs due to leakage or other typical conditions. Thus, the IEEE 802.3af discovery process now proceeds normally in the higher voltage ranges (6V to 9V) where the device of this disclosure is effectively out of the circuit, causing no interference. A low-powered device in accordance with this disclosure may deploy a local capacitor acting as a temporary power supply while the attached PSE does a back-off routine (executes a discovery cycle where it forces the device to become high impedance and temporarily aborts its current draw).

As will now be appreciated, the device of this disclosure may now be classified as an Ethernet powered device in IEEE terminology. Additionally, as the disclosed device draws a distinctive amount of DC current, the value of the DC current it draws may be used as an additional signature and classification value that provides a common mode signature that can coexist with the 25 kΩ signature resistance. As the device of this disclosure may be found below 5V, the presence of a special powered device may be flagged in accordance with the teachings of this disclosure. Thus, the fact that the disclosed device draws power at a low voltage and draws no power above a certain threshold when in a high-impedance state, may itself provide a unique signature and classification scheme. Likewise, the other current drawing scenarios occurring in other voltage ranges of this disclosure may also be used to define other discovery/classification schemes.

Figure 6:
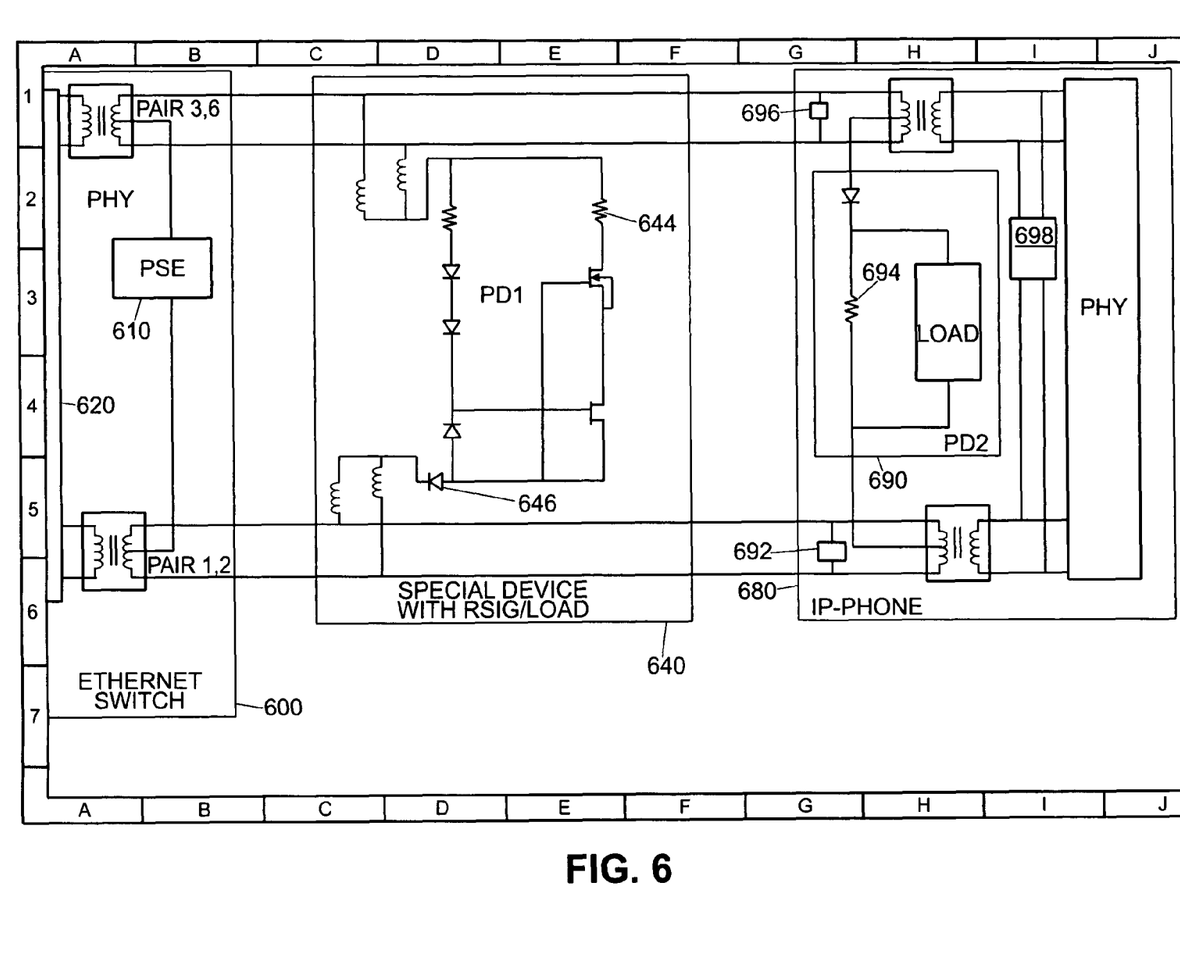
FIG. 6 is an exemplary schematic diagram of an Ethernet system capable of supplying data and inline power supporting the embodiment disclosed herein.

For example, while this disclosure demonstrates the use of a PSE voltage below 5V in order to supply power to a device similar to PD1 as shown in FIG. 6, other voltage ranges may be applicable such as 10-15V or 20-30V where a PSE might deliver more current to powered PD1, while keeping both the IEEE 802.3af discovery and classification circuitry and implementations compliant with the standard and the complexity of the PSE circuitry under control.

It is contemplated that multiple devices similar to PD1 may be connected in series with an 802.3af-compliant PD that would present a 25 kΩ signature resistor. As disclosed herein, the devices are configured to enter a high impedance state in the specified detection ranges (0-5V) and somewhere between 12-15V and 20-30V. The amount of devices that may be chained in accordance with this disclosure is limited by the amount of leakage that affects the discovery process and whether the discovery process uses the applied voltage measure current method or the force current measure voltage method. Another limitation on such a cascading scheme would be the multiple autotransformers present in parallel that would affect (lower) the inductance of the loop and burden the reliable transfer of data.

For example, if low-power device has a window comparator to allow it to present its load and signature to the PSE between 10 to 15V or 20-30V, the same results may be achieved. Also, the IEEE spec allows the maximum detection voltage to reach 30V with limited current, a pseudo-compliant PD and PSE devices may be designed to meet the specification of IEEE 802.3af and enable a host of pseudo-compliant PD devices similar to PD1 and in different voltage ranges may be exploited where the IEEE 802.3af does not define the behavior of a PD.

Figure 3:
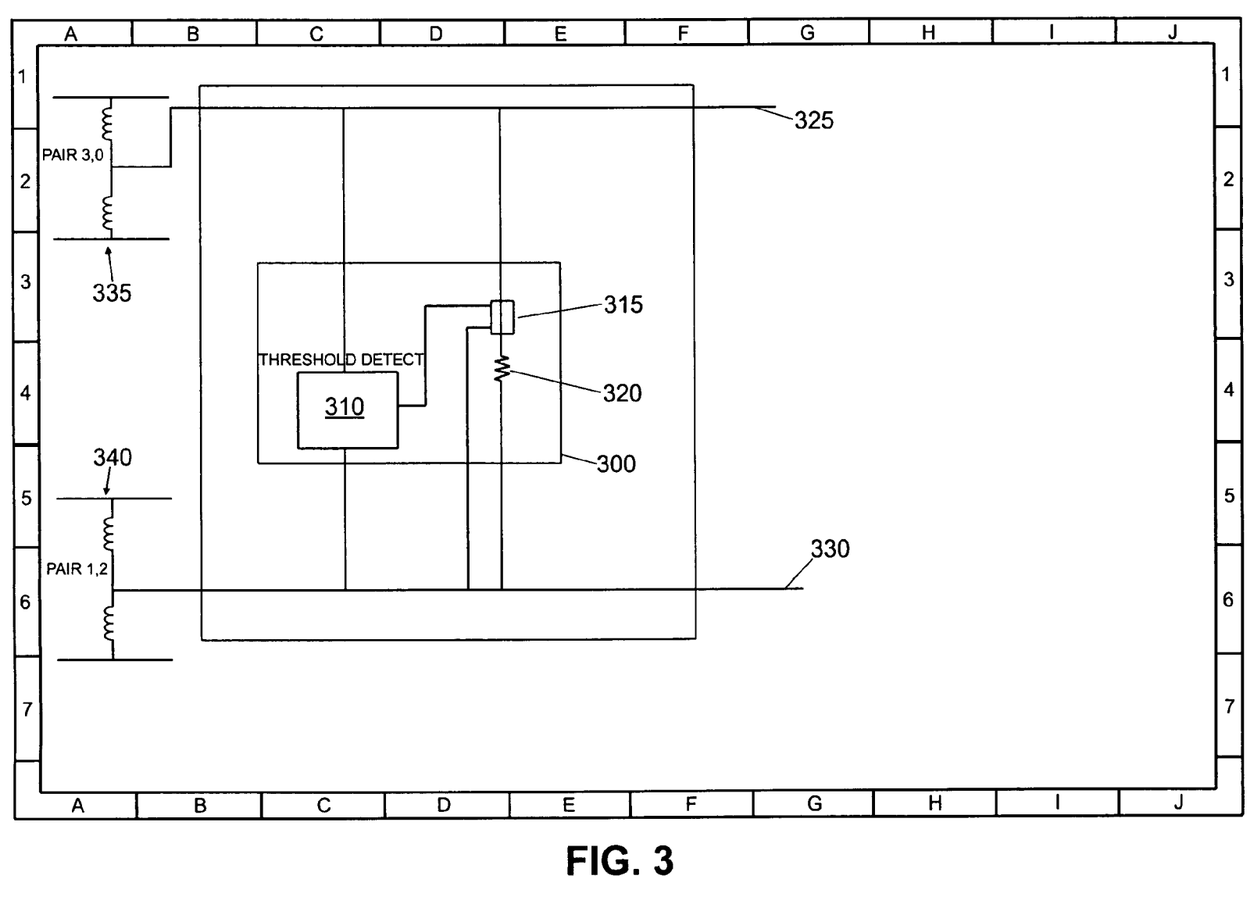
FIG. 3 is a block diagram of an Ethernet powered device configured in accordance with this disclosure.

FIG. 3 is a block diagram of an Ethernet powered device 300 configured in accordance with this disclosure. FIG. 3 shows the device 300 including threshold detect circuitry 310 for monitoring the voltage across two pairs in a cable. In a preferred embodiment, the device 300 is coupled between two pairs in a cable through the common mode nodes a pair of autotransformers 335 and 340 formed by coils L1 and L2, and L3 and L4, respectively. The device 300 may be coupled to the autotransformers through a DC return rail 325 and a negative rail 330. The device 300 is shown as being coupled between pairs 3,6 and 1,2, but of course the device 300 may be coupled between other pairs as desired.

In a preferred embodiment, the threshold detect circuitry 310 is configured to monitor the voltage across the cable pairs through the autotransformers in order to detect a level that is higher than a predetermined threshold. In a preferred embodiment, the threshold may comprise a level that is within the IEEE detection window but outside of the range of voltages used by a specific PSE. The IEEE detection voltages as specified in the IEEE 802.3af specification are valid up to 30V, while a valid IEEE PD may draw classification current in the range of 15-20V, 802.3af leaves windows of usable voltage ranges between 10-15V, and 20-30V, where 310 would be designed to enable Rload 320 to draw current in these ranges (10-15V and 20-30V) while turning into a high impedance load outside these ranges. In this disclosure, the preference is given to the range below 5V to keep the cost of the PD circuitry low and avoid the cost and complexity resulting from the need of voltage converters to reduce the voltage potential back to the more common values of 5V or lower where inexpensive components can be acquired.

It is also possible that a low-powered device in accordance with the teachings of this disclosure may make use of more than one range of voltage to draw power. For example, the device may draw power below 5V, while being placed in a high impedance state in both the detection and classification voltage ranges as defined in IEEE 802.3af, while also being operable in either or both of the 10-15V and 20-30V ranges.

The device 300 further includes a switch 315 coupled with a load 320. The switch 315 is preferably configured to selectively couple the load 320 to the rails 325 and 330, thereby selectively isolating the load 320 from the PSE. In a further preferred embodiment, the switch 315 is operated under control from the threshold detect circuitry 310. It is contemplated that when the voltage as sensed by the threshold detect circuitry 310 is below a threshold, the load 320 will be switched in via the switch 315, thereby allowing current to be sourced by the load 320. When the sensed voltage exceeds a threshold, the load 320 will be isolated from the system when switch 315 opens, allowing the discovery process to proceed normally i.e. to discover the 25 kΩ signature resistance presented without the risk of performance complications due to the dynamic range requirements on resolving the 300 μA current out of a 3 mA or higher current.

Figure 4:
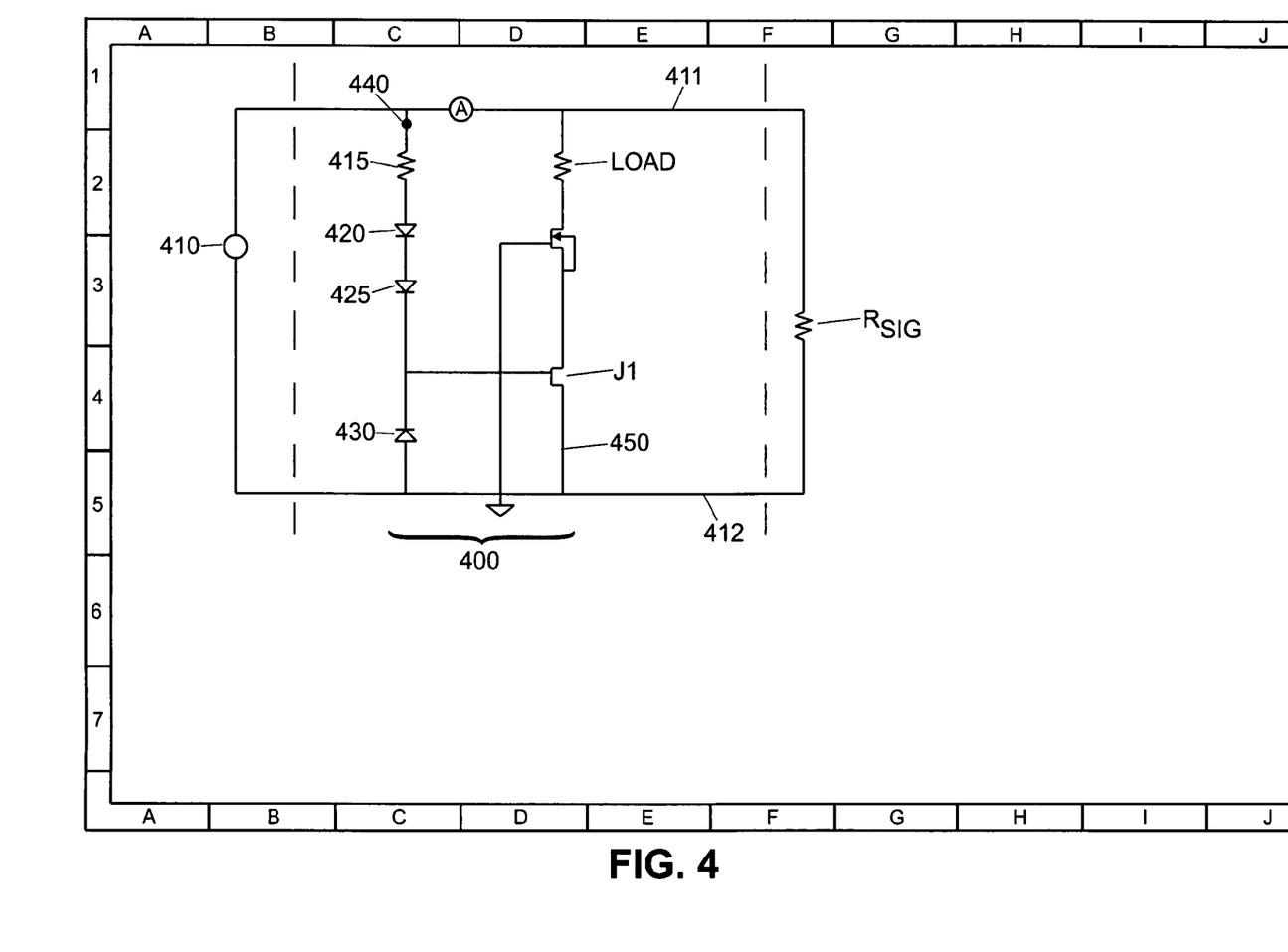
FIG. 4 is an exemplary schematic diagram of an Ethernet powered device configured in accordance with the teachings of this disclosure.

FIG. 4 is an exemplary schematic diagram of an Ethernet powered device 400 configured in accordance with the teachings of this disclosure. FIG. 4 includes a voltage source 410, representing the power source of the PSE to which the device 400 would normally be coupled. The voltage source 410 is shown being coupled through positive and negative rails 411 and 412, respectively, to a signature resistor Rsig, representing the 25 kΩ signature resistance of the PD to which the device 400 would normally be attached.

The device 400 includes a first circuit branch 440 configured to function as the threshold detection circuitry described above. In a preferred embodiment, the first branch includes a 10 MΩ resistor 415 coupled to the positive rail 411. Coupled to the resistor 415 are a pair of diodes 420 and 425. Coupled between the diode 425 and the negative rail 430 is a zener diode 430.

The device 400 includes a second branch 450 configured to selectively isolate a load based on conditions sensed by the first branch 440 of threshold sensing circuitry. The second branch includes a resistor Rload representing the load to be powered. The load is shown as a resistance to model the effect, though loads of any equivalent effective resistances may be powered using different circuit configurations. The load is shown as being coupled to the positive rail 411. Coupled to the Rload in series is a transistor M1, illustrated as comprising an N-channel depletion transistor. M1 preferably comprises a switch that is normally closed when no power is applied; other switches may be employed.

Coupled between the transistor M1 and the negative rail is a switch J1, shown as comprising a P-channel switch. The gate of J1 is coupled to the node between the zener diode 430 and diode 425. J1 is provided for added protection of M1; other devices and configurations such as a zener diode and diode to prevent reverse voltages from being applied may be employed.

In operation, the depletion switch M1 and switch J1 are normally closed when no voltage is applied. In this state, current may be sourced by the load through the second branch 450. As the applied voltage rises above approximately 5V, the switch J1 will open up, removing the second branch from the negative rail 412 and thereby removing the Rload from the circuit. The device 400 will now be placed in a high impedance state. At this point, the only current flowing through the device 400 will be the minimal current flowing through the 10 MΩ resistor. Current will thus be free to flow through the signature resistor Rsig, thus allowing the discovery process to proceed normally.

Figure 5:
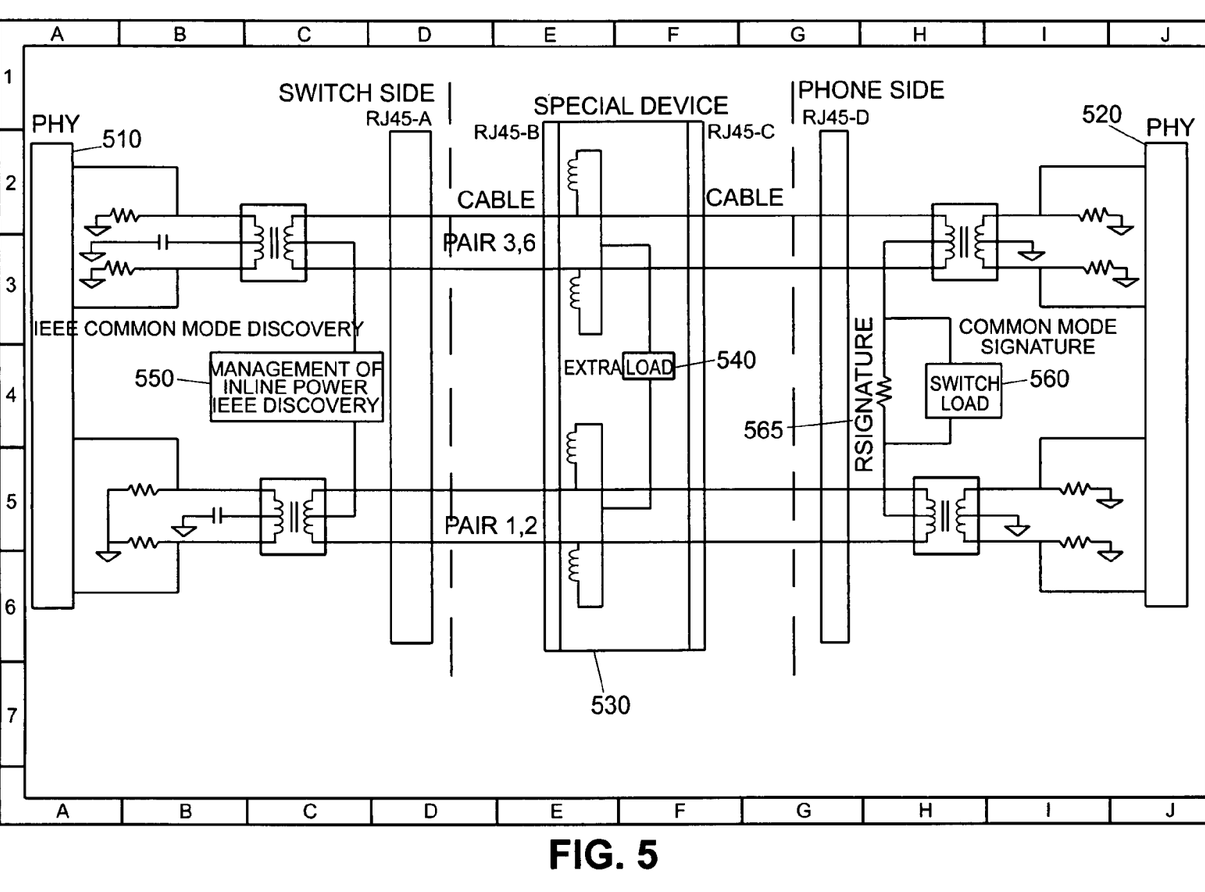
FIG. 5 is an exemplary schematic diagram of an Ethernet system including a powered device configured in accordance with the teachings of this disclosure.

FIG. 5 is an overall schematic diagram showing a powered device disposed between a pair of Ethernet devices in accordance with this disclosure. FIG. 5 shows a pair of PHYs 510 and 520 coupled through Ethernet cable pairs 3,6 and 1,2. On the switch side, IEEE discovery circuitry 550 is shown being coupled to pairs 3,6 and 1,2 through magnetic coupling circuitry XTX and XRX, respectively. Likewise, the PD side is shown including inrush control circuitry 560, a 25 kΩ signature resistor 565, coupled to pairs 3,6 and 1,2 through magnetic XRCV and XTXPD, respectively.

FIG. 5 illustrates a powered device 530 of this disclosure being coupled between a switch and a powered device. As disclosed above, the powered device 530 is shown as including the extra load 540 that is coupled to pair 3,6 through coils L1 and L2, and pair 1,2 through coils L3 and L4. FIG. 5 also shows that the device of this disclosure may be coupled between two Ethernet devices through the use of standard connectors, such as RJ45B and RJ45C connectors as illustrated in FIG. 5.

FIG. 6 is an exemplary schematic diagram of an Ethernet system 600 capable of supplying data and inline power supporting the embodiment disclosed herein. PSE 610 may produce two test voltages in the 6-10V range, while it measures the current at each of the voltages supplied to calculate the dV/di ratio in search of a 25 kΩ resistor 694. In accordance with the teachings of this disclosure, the PD1 640 may be embodied as a patch panel with an LED to flag the presence of inline power, a dongle that acts as a pair splitter that indicates the presence of inline power on 4-pairs, or a mid-span system flagging the presence of inline power on the 'unused' pairs (4,5 and 7,8).

PD1 may draw milli-amp ranges of current below 5V or the range of voltages chosen as discussed in this disclosure through its load and 'signature' 644 (presented here as a resistor). When device 680 is plugged into PD1, PSE 610 may be doing periodic checks for the 'introduction' of PD2 by going above 6V and measuring the load current and may opt to stay above 6V for several milliseconds of time before returning to a lower voltage if it recognizes no valid signature (25 kΩ).

Also PSE 610 may rely on other means to start a detection cycle keeping the power to PD1 steady and undisrupted. Such means may comprise a single pair identity network present across pair 1,2 and/or pair 3,6 (696, 692) as shown in 680 of FIG. 6, or a differential identity network 698 as presented in device 680 and discovered by PHY 620 in the Ethernet system 600.

Figure 7:
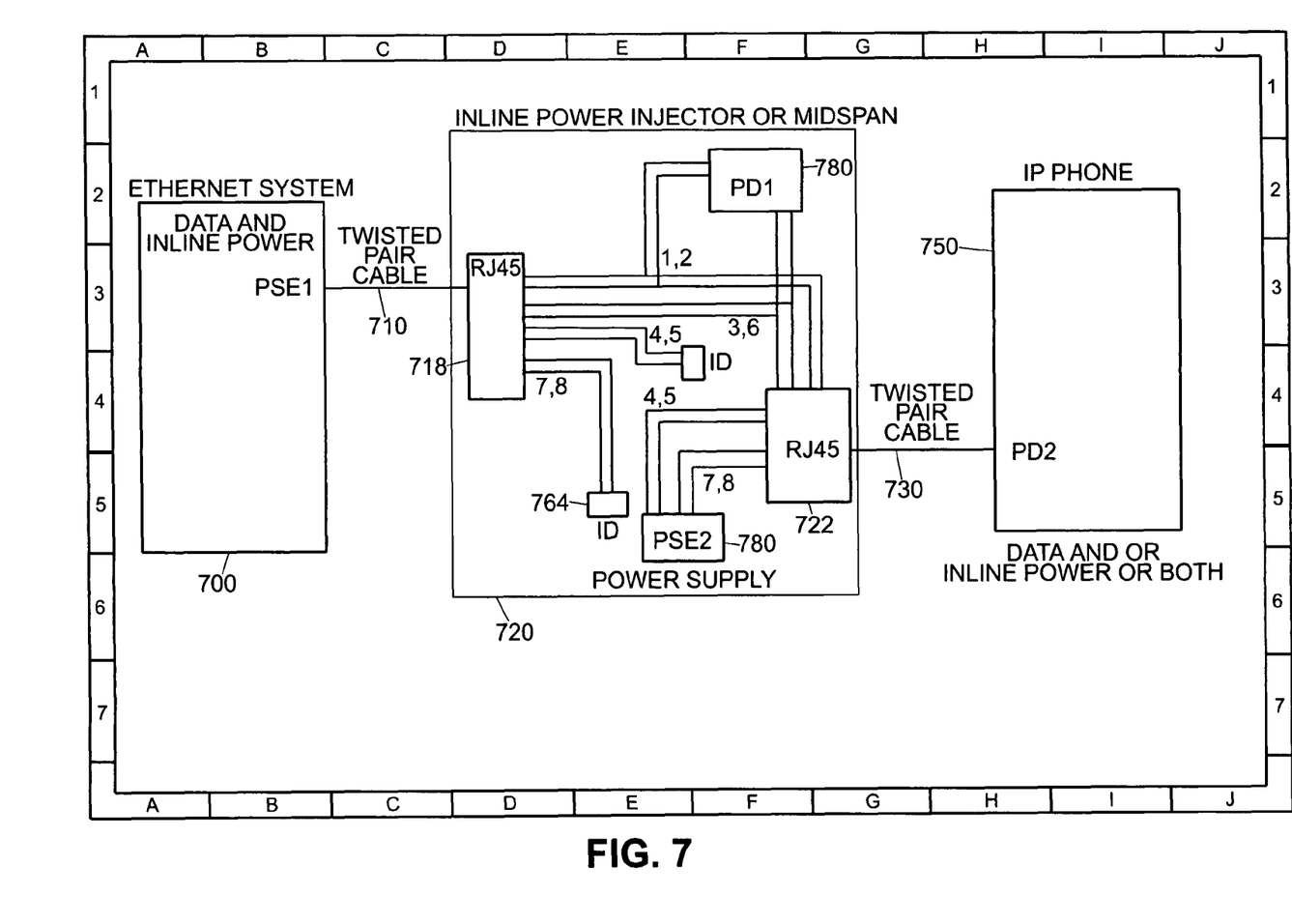
FIG. 7 is an exemplary schematic diagram of an Ethernet system capable of supplying 10/100 Ethernet data and inline power on one set of pairs in a single cable.

FIG. 7 is an exemplary schematic diagram of an Ethernet system 700 capable of supplying 10/100 Ethernet data and inline power on one set of pairs in a single cable through each single RJ45 connector or the like. Cable 710 connects such a system to a mid-span power system. A mid-span power system as known in the art is a system where typically two pairs in a cable are effectively 'cut' and power is imposed on them to be delivered to a PD 750, such as an IP telephone or similar device over cable 730. The mid-span power injector may present a PD1 780 to PSE1 over pairs 1,2 and 3,6 as shown in 720. The presence of this special PD1 allows PSE1 to identify the presence of the midspan and the signature supplied by PD1 may be used to instruct PSE1 to never supply power even if it discovers the 25 kΩ signature resistance.

Also the power available from the midspan may be encoded in the 'signature' value of PD1. Lastly, the midspan may dynamically alter the state of the signature presented by PD1 to enable inline power from PSE1 for a redundancy application and the like.

Figure 8:
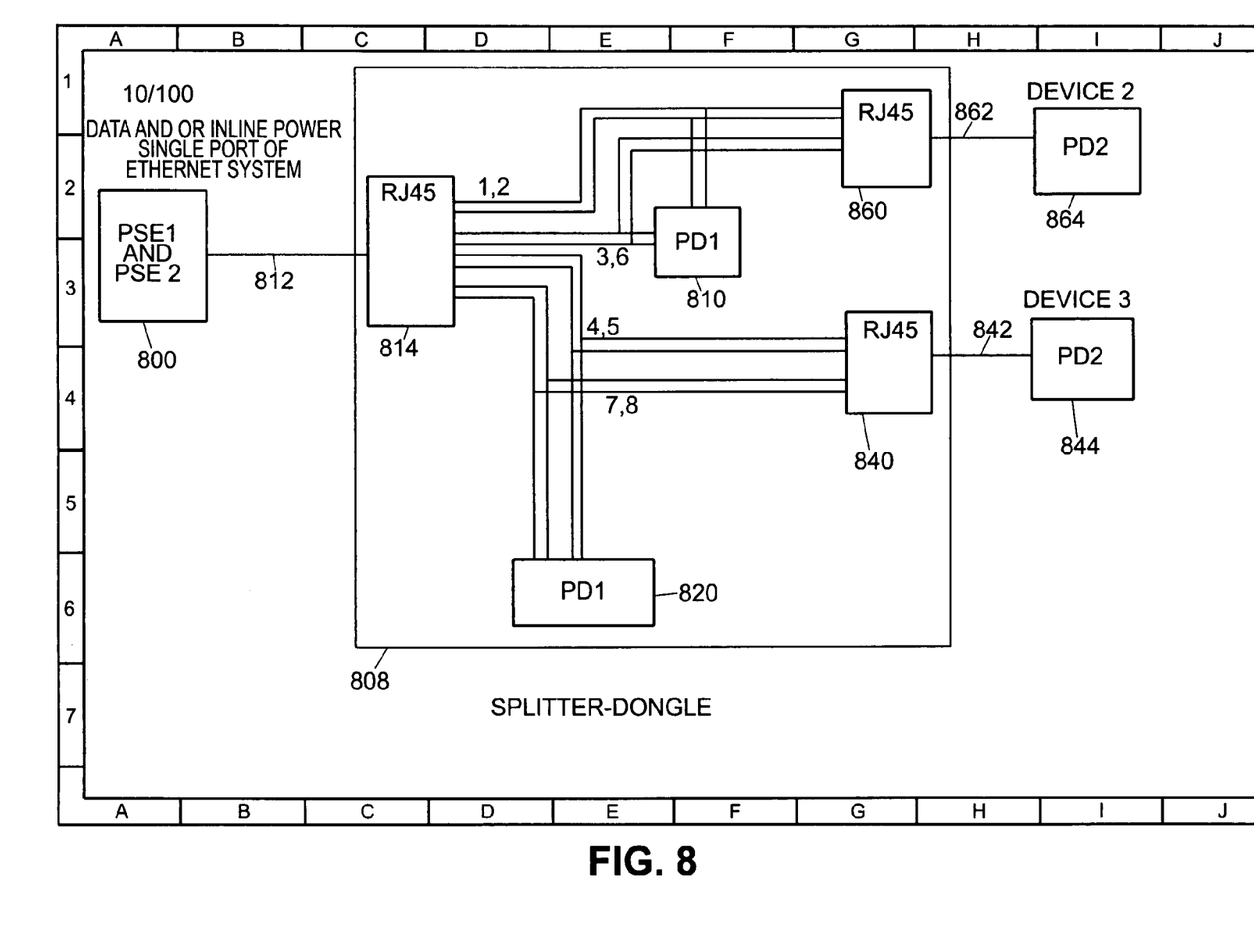
FIG. 8 is an exemplary schematic diagram of an Ethernet splitter-dongle embodiment.

FIG. 8 is an exemplary schematic diagram of an Ethernet splitter-dongle 808 capable of taking data and inline power from an Ethernet system 800 over a single cable 812 into a single RJ45 814 and 'splitting' or routing 10/100 data and inline power to two different RJ45 connectors, 840 and 860, enabling connectivity to two different devices 844 and 864 respectively over two different cables 842 and 862. Two devices similar to PD1 as described above may be deployed inside such a splitter on each set of pairs to enable the 800 Ethernet system to identify the presence of such a splitter device while providing an LED light as a part of PD1 to indicate to the user the availability of data and or inline power on each set of pairs.

Also PD1 810 and 820 may be configured to include interdependent circuitry such that if inline power is applied on one set of pairs 810, the signature and class provided by 820 may be changed to instruct the proper PSE present in 800 not to supply power or perform certain tasks. This concept is similar to the example shown in FIG. 7 for the midspan.

Figure 9:
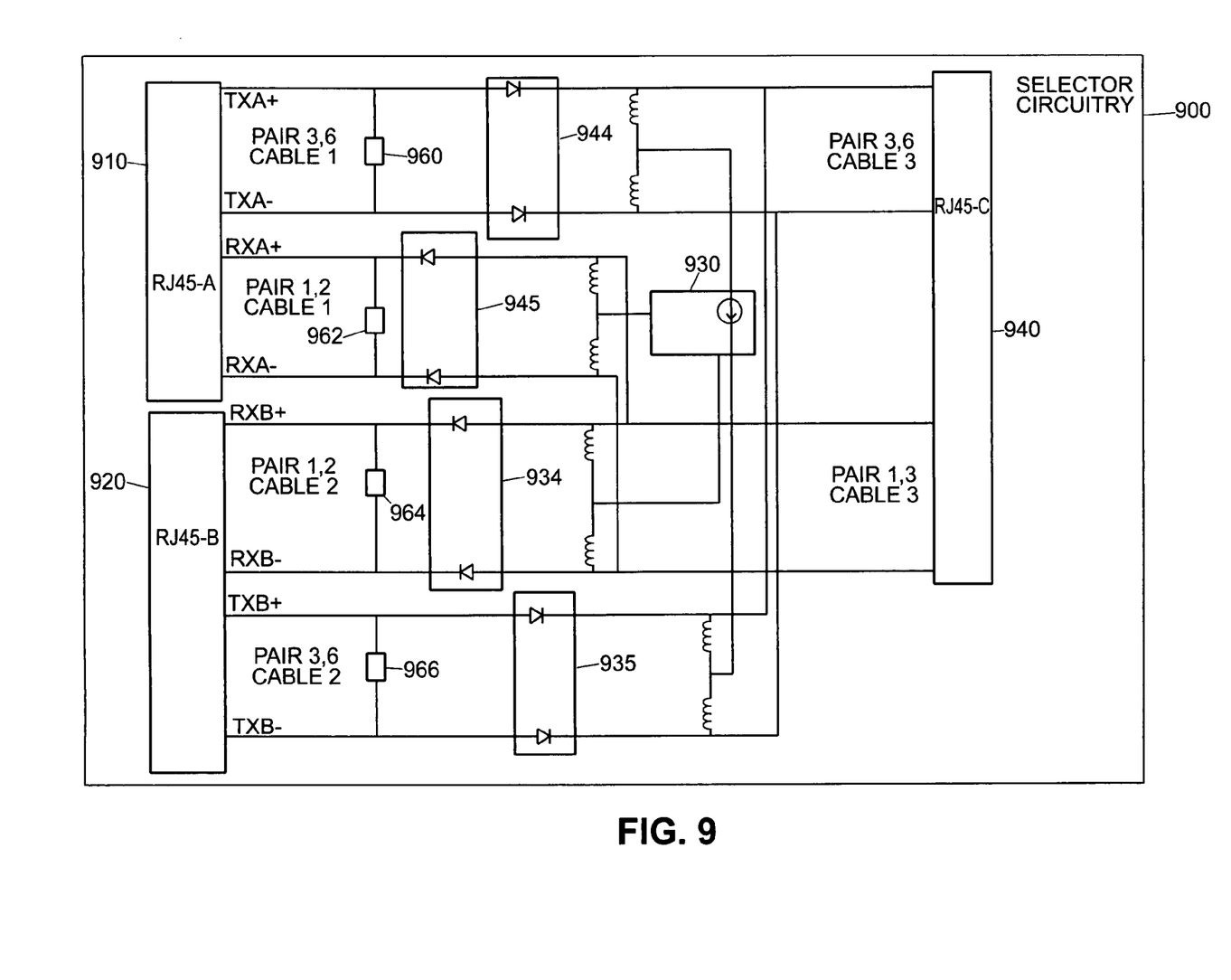
FIG. 9 is an exemplary schematic diagram of an Ethernet redundancy application.

FIG. 9 is an exemplary schematic diagram of an Ethernet redundancy application where a special PD1 device is used to enable data and power flow from one Ethernet system at a time while providing a high impedance or no loading state to the standby system. A dongle device 900 accepts data and power from two different systems over two different cables into RJ45-A 910 and RJ45-B 920. The presence of PD1 930 allows both systems to detect the presence of such a redundancy enabling device. To keep the disclosure brief not all conditions are examined that detail the interference caused by the possibility of two different PSE devices (not shown) attached to 910 and 920 may cause interference in the detection of PD1 (i.e., one PSE may be doing a 25 kΩ signature detection check causing the other PSE attached to initiate its own detection cycle since it could not see device 930).

The presence of these single pair identity networks may define the master/slave relationship between the devices attached to 910 and 920 supplying data and inline power. Once device 930 has been designated as a load (and agreement is reached as to whether the PSE attached to 910 or 920 is the master) it plays an important role in drawing enough DC current to 'bias' the four diodes (present in the signal path, such as DTAP, DTAN, and DRAP, DRAN) ON, thus enabling the AC data signals to flow from the master Ethernet device present. This allows legacy devices attached to connector 940 or RJ45-C to communicate with the master due to the presence of diodes that otherwise may not conduct full cycle.

Thus, the role of PD1 here is to enable communication between the active data device acting as master attached to either 910 or 920 while the slave awaits for an enable command that configures it as the master by instructing it to deliver its own DC current to bias the diode on and satisfy the load presented by 930 thus enabling communication and power delivery from either one of the devices attached to 910 or 920 to a third device attached to 940 over a third cable upon request.

The presence of multiple low power devices between a single PSE/PD connection may be detected and each of the attached devices directed to draw power in different voltage ranges as discussed in this disclosure. Power drawn by an attached device, when measured by the PSE outside the normal 802.3af operational voltages of classification detection and normal full supply modes, may be used to inform the PSE with information about the configuration of each the attached devices. For example, if the splitter draws power in the 10-15v range, and an LED low power PD draws power below 5v, the PSE now knows that there are two more devices in addition to the 802.3af attached PD if present and acts accordingly. While few examples of such low power devices have been described, numerous applications of this concept for different devices and configurations are within the scope of this disclosure.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A low power Ethernet-compatible powered device operable between an Ethernet Power Source Equipment (PSE) and an Ethernet Powered Device (PD), comprising:
   a first Ethernet port configured to receive an electrical signal from the PSE;
   a second Ethernet port configured to connect the low power Ethernet-compatible powered device to the PD and forward the electrical signal to the PD, wherein the forwarded electrical signal comprises both a DC signal and an AC signal, and wherein the first Ethernet port and the second Ethernet port are coupled by at least two pairs of Ethernet cables;
   threshold detection circuitry disposed between a return rail and a negative rail of the first Ethernet port, each rail being coupled to a respective pair of the Ethernet cables; and
   a load and a switch coupled in series between the return and negative rails, the switch being controlled by the threshold detection circuitry to selectively close the switch and provide the electrical signal to the load;
   wherein the threshold circuitry and the switch are configured to switch the load in, allowing the load to source current from the respective pairs of Ethernet cables when a voltage sensed by the threshold circuitry is below a predetermined threshold, and open the switch when the sensed voltage exceeds the predetermined threshold.

2. The device of claim 1, wherein the low power Ethernet-compatible powered device is placed in a high-impedance state when an applied voltage of the electrical signal exceeds 5V.

3. The device of claim 2, wherein the load sources current when the electrical signal has a voltage below 5V.

4. The device of claim 1, wherein the low power Ethernet-compatible powered device is classified as an Ethernet powered device.

5. A system, comprising:
   an Ethernet Power Source Equipment (PSE);
   an Ethernet Powered Device (PD); and
   a low power Ethernet-compatible powered device operable between the PSE and the PD, comprising:
   a first Ethernet port configured to receive an electrical signal;

a second Ethernet port configured to connect the low power Ethernet-compatible powered device to the PD and forward the electrical signal to the PD, wherein the forwarded electrical signal comprises both a DC signal and an AC signal, and wherein the PSE and PD are coupled by at least two pairs of Ethernet cables;

threshold detection circuitry disposed between a return rail and a negative rail of the first Ethernet port, each rail being coupled to a respective pair of the Ethernet cables; and a load and a switch coupled in series between the return and negative rails, the switch being controlled by the threshold detection circuitry to selectively close the switch and provide the electrical signal to the load;

wherein the threshold circuitry and the switch are configured to switch the load in, allowing the load to source current from the respective pairs of Ethernet cables when a voltage sensed by the threshold circuitry is below a predetermined threshold, and open the switch when the sensed voltage exceeds the predetermined threshold.

6. The system of claim 5, wherein the low power Ethernet-compatible powered device is placed in a high-impedance state when an applied voltage of the electrical signal exceeds 5V.

7. The system of claim 6, wherein the load sources current when the electrical signal has a voltage below 5V.

8. The system of claim 5, wherein the low power Ethernet-compatible powered device is classified as an Ethernet powered device.

* * * * *